United States Patent
Clarke et al.

(10) Patent No.: US 7,399,725 B2
(45) Date of Patent: Jul. 15, 2008

(54) PERCHLORATE DESTRUCTION

(75) Inventors: Robert Lewis Clarke, Orinda, CA (US); Stephen Harrison, Benicia, CA (US); Brian J. Dougherty, Menlo Park, CA (US)

(73) Assignee: Applied Intellectual Capital, Alameda, CA (US)

( * ) Notice: Subject to any disclaimer, the term of this patent is extended or adjusted under 35 U.S.C. 154(b) by 483 days.

(21) Appl. No.: 11/111,085

(22) Filed: Apr. 20, 2005

(65) Prior Publication Data

US 2005/0239632 A1    Oct. 27, 2005

Related U.S. Application Data

(60) Provisional application No. 60/564,905, filed on Apr. 23, 2004.

(51) Int. Cl.
*B01J 20/34* (2006.01)
*B01J 38/62* (2006.01)
*B01J 38/60* (2006.01)

(52) U.S. Cl. .......................... 502/28; 502/27

(58) Field of Classification Search ................ 502/11, 502/12, 20, 28, 27; 210/683, 681, 660, 670, 210/673, 600; 205/704, 688
See application file for complete search history.

(56) References Cited

U.S. PATENT DOCUMENTS

| 5,266,173 A | * | 11/1993 | Bandlish et al. | ............. 205/436 |
| 6,358,396 B1 | * | 3/2002 | Gu et al. | ..................... 205/704 |

* cited by examiner

*Primary Examiner*—Steven Bos
*Assistant Examiner*—Anthony J Zimmer
(74) *Attorney, Agent, or Firm*—Fish & Associates, PC

(57) ABSTRACT

Perchlorate is removed and effectively destroyed in devices and methods that employ a eluting solvent in which the anion of an acid solubilizes Ti (III), which may be electrochemically generated or added in situ. Using such solvents, destruction of perchlorate is unexpectedly and several orders of magnitude faster than using solvents without solubilizing acids. In most preferred aspects, the solubilizing acid is methane sulfonic acid and/or sulfamic acid, and Ti (III) is electrochemically generated. Perchlorate destruction will then result in formation of Ti (IV), which may be present in the eluent in a subsequent elution.

20 Claims, 8 Drawing Sheets

PERCHLORATE DESTRUCTION

This application claims the benefit of our copending U.S. provisional patent application with the Ser. No. 60/564,905, which was filed Apr. 23, 2004.

FIELD OF THE INVENTION

Water treatment, especially as it relates to removal and destruction of perchlorate.

BACKGROUND OF THE INVENTION

Excessive concentrations of perchlorate in the environment, and especially in water consumed by human is highly problematic as perchlorate is known to interfere with iodide uptake into the thyroid gland. Dysregulation of iodide uptake is often manifested in disruption of thyroid functions, leading to several problems, including impaired regulation of energy metabolism, problems associated with development of fetus and young children, and in some cases even promotion of tumor growth. Despite the known dangers of perchlorate, California has currently no established drinking water standard or maximum contaminant level (MCL) for perchlorate. Instead, the department of health and safety (DHS) refers to an action level for perchlorate of 6 micrograms per liter (µg/L), which is expected to become the MCL.

It is well known in the art to capture perchlorate from potable water using an anion exchange resin. However, resins are expensive and typically only concentrate and transfer the problem from the water source to the eluent. Moreover, many anion exchange resins will capture other anions, including sulfate, nitrate, and bicarbonate. To circumvent non-specific binding of other anions, perchlorate specific anion exchange resins may be used. For example, suitable anion exchange resins include SYBRON™ SR-6 and 7, LEWITT™ 6362, PUROLITE™ A 520E, A 530 E, A 600 E and A 850 E or Rohm & Haas' AMBERLITE™ PWA 2 and IMAC 555 HP.

Despite the relatively high selectivity of certain resins towards perchlorate, various difficulties nevertheless remain. Among other things, competing anions are often present in 100- to 1000-fold (and even higher) molar excess, and will therefore still capture substantial quantities of non-perchlorate anions. Consequently, most of these resins cannot be effectively regenerated by simple methods such as brine or caustic treatments, but require relatively cumbersome regeneration methods (e.g., high temperature and pressure treatment with tetrachloroferrate as described in U.S. Pat. No. 6,448,299 and U.S. Pat. Appl. 2003/0222031). Other methods, such as on-column destruction of perchlorate by an aqueous solution of titanium-(III)-oxalate complexes require addition of alcohols to accelerate the perchlorate destruction reaction, as described in U.S. Pat. No. 6,358,396. The use of titanium (III) to reduce perchlorate to chloride was also reported by Cope et al., J. Chem. Soc. A; 301 (1967), and again by Lui et al., Inorg. Chem. 23, 3418, (1984). Though attractive at first sight, such methods typically fail to remove sulfate and bicarbonate from the resin, as these methods will only reduce perchlorate to chloride. Thus, as neither carbonate, bicarbonate, nor sulfate are reducible with titanium (III), the exchange medium requires additional regeneration by alternative techniques to remove carbonate, bicarbonate, sulfate, and nitrate. Furthermore, the '396 patent teaches that organic chelating agents (e.g., oxalate) are necessary to stabilize the titanium (IV) and prevent hydrolysis to titanium dioxide. Consequently, such methods are of limited commercial value due to the relatively low concentrations of titanium (III) species used for the reaction, and the slow rate of reduction even at relatively high concentrations of perchlorate ions.

Electrochemical generation and regeneration of Ti (III) from Ti (IV) in sulfuric acid and methanesulfonic acid are described respectively by Bandlish in U.S. Pat. No. 5,266,173 and Harrison in U.S. Pat. Nos. 5,246,553, 5,409,581, and 5,679,235. In these patents, titanium (III) is used for the mediated electro-organic synthesis of aromatic amines and other compounds. Foller et al also describe in U.S. Pat. No. 5,250,162 the electrochemical generation of Ti (III) in the context of the manufacture of titanium dioxide.

Therefore, although numerous methods and configurations for perchlorate destruction are known in the art, all or almost all of them suffer from one or more disadvantages. Consequently, there is still a need to provide improved compositions, methods and devices for perchlorate destruction.

SUMMARY OF THE INVENTION

The inventors discovered that Ti (III) assisted perchlorate destruction can be significantly accelerated using methanesulfonic acid (and related acids that increase solubility of Ti (III)). Using such systems, perchlorate can be eluted from a resin using concentrated methanesulfonic acid containing Ti (IV) to form an eluent, which is then electrochemically reduced to Ti (III) that destroys perchlorate to chloride in a known reaction. It should be particularly appreciated that contemplated methods can be employed with both, non-selective anion exchange resins as well as with perchlorate selective ion exchange resins. In preferred aspects, and especially where non-selective anion exchange resins are used, the non-perchlorate anions are eluted with brine while perchlorate remains tightly bound, and the so partially regenerated resin is then treated with the optionally Ti(IV)-containing methanesulfonic acid, while perchlorate specific exchange resins may be directly eluted with the methanesulfonic acid.

It should be especially appreciated that contemplated methods, configurations, and/or devices provide numerous advantages. Among other things, the rate of reaction for perchlorate to chloride in methanesulfonic acid and/or related acids that increase solubility of Ti (III) is significantly higher as compared to other solvents. Moreover, the perchlorate destruction may be performed at ambient pressure, even without a heating step and/or addition of organic accelerants or chelators (e.g., oxalic acid, EDTA, etc.).

The inventors have further discovered that contemplated methods and devices can be used for processes in which perchlorate and nitrate are captured by ion exchange resins (e.g., PWA 2 and IMAC 555), and especially when both, perchlorate and nitrate, are present in potable or other waters that require treatment. In such processes, the ion exchange resin can be eluted and/or regenerated with an alkylsulfonic acid, and most preferably with methanesulfonic acid that additionally comprises one or more dissolved salts of titanium. Eluted nitrate will then rapidly react with titanium (III) to generate ammonia or an ammonium salt in the methanesulfonic acid, and periodic transfer of the anolyte from the anolyte compartment to the catholyte compartment will allow electrochemical destruction of any ammonia that may have built up in the catholyte compartment.

Various objects, features, aspects and advantages of the present invention will become more apparent from the following detailed description of preferred embodiments of the invention along with the accompanying drawing.

DETAILED DESCRIPTION

The inventors discovered that Ti (III)-assisted perchlorate destruction can be significantly accelerated using acids that increase solubility of titanium ions, and particularly using sulfamic acid and/or methanesulfonic acid (MSA). Such destruction has sufficiently fast kinetics to allow the reaction to be run at ambient conditions, and even in the presence of non-perchlorate ions. Still further, it is preferred that contemplated acids will allow facile elution of the perchlorate from the column (and/or in a less preferred aspect, on-column destruction).

Figure 1:
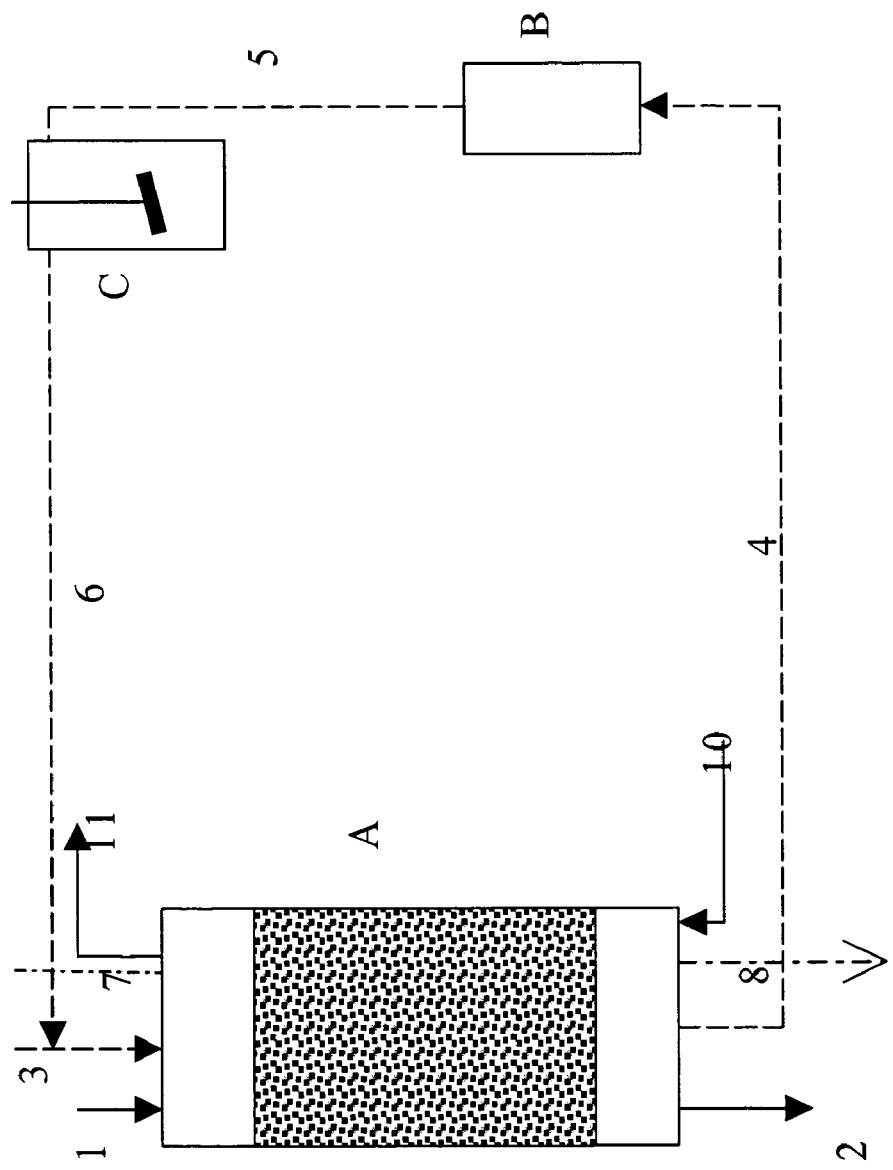
FIG. 1 is a schematic of one exemplary configuration according to the inventive subject matter.

In one exemplary aspect of the inventive subject matter, perchlorate is eluted from a resin that is specific for perchlorate. It should be recognized that in such methods the concentration of non-perchlorate anions is significant. As depicted in FIG. 1, potable water (or wash solutions from contaminated soil, etc.) contaminated with perchlorate, sulfate, nitrate, and/or bicarbonate is fed via stream (1) through perchlorate specific exchange resin (A). Perchlorate is adsorbed onto the resin along with other anion species. Once the ion exchange resin has bound a predetermined quantity of perchlorate and/or other anionic species, or once the resin has exhausted perchlorate binding capacity, perchlorate ions begin to appear in the effluent (2) of the ion exchange column. At this point, the ion exchange column can be switched out of service (e.g., flow of potable water is stopped or the flow is fed to a second column), for example, by diverting stream (1) to a second ion exchange resin (not shown).

The Resin (A) is then regenerated by passing a relatively concentrated solution of MSA anions containing titanium (IV) ions via line 3, typically removing about 80% of the perchlorate adsorbed on to the ion exchange resin. The regenerant (eluent) is fed via line 4 to the cathode compartment of an electrochemical cell (B), that is divided by a separator (e.g., ion exchange membrane such as NAFION, or microporous or macroporous separators such as GORETEX; not shown). Once elution is completed, the ion exchange resin is rinsed with water from wash stream (7) to form waste stream and (8), and is then ready for service as perchlorate adsorber.

In electrochemical cell B, Ti (IV) ions are reduced to Ti (III), and the reduced solution is then transferred via line (5) to separate tank (C) where the perchlorate reacts with the so generated titanium (III) to produce chloride. Once the perchlorate concentration is sufficiently reduced, the MSA solution is ready for use as a regenerant of an ion exchange column (e.g., via recycling line (6)). It should be particularly noted that nitrate ions present in the regenerant solution will also be reduced by titanium (III) to ammonia.

Alternatively, in another exemplary aspect of the inventive subject matter, perchlorate is eluted from a resin that is non-specific for perchlorate (e.g., PUROLITE's A 520 E, or Rohm-Hass IMAC 555®). Such resins are nominally a nitrate selective resins, however exhibit a significantly greater affinity for perchlorate than nitrate. Therefore, it should be recognized that non-perchlorate anions can be eluted with a eluent that will not (or to a significantly lesser degree) elute the perchlorate from the resin. For example, brine can be employed to remove nitrate, sulfate, and/or bicarbonate.

With further reference to FIG. 1 and a non-specific resin, it is contemplated that once the anion exchange resin (A) is saturated with perchlorate, regeneration is performed with brine to remove nitrate, sulfate, bicarbonate, and other anions using brine lines 10 and 11. After brine elution, the resin A is further regenerated by passing a relatively concentrated solution of MSA anions containing titanium (IV) ions to remove perchlorate. Once more, about 80% of the perchlorate adsorbed on to the ion exchange resin can be removed using such procedure. The ion exchange, once rinsed with water via lines (7) and (8), is ready for service as a perchlorate absorber, and the MSA eluent is then processed as described above. With respect to the brine regeneration, it should be noted that there are numerous manners of regenerating brine known in the art, and all of those are contemplated suitable herein. However, especially preferred methods of brine regeneration are described in our U.S. provisional patent application with the Ser. No. 60/535,209, which was incorporated by reference into the priority application with the Ser. No. 60/564,905, which is also incorporated by reference herein.

Alternatively, it should be recognized that contemplated configurations and methods may also be implemented as a retrofit in an already existing ion exchange plant. Most typically, such plant will include a non-selective anion exchange resin to which perchlorate, nitrate, and other anions are bound. Upon regeneration with brine (or other eluent), the perchlorate and at least some of the nitrate and can be re-captured on a perchlorate selective resin (e.g., A 530 E, or PW2A, commercially available from Purolite or Rohm & Haas, respectively). Once bound, the perchlorate may then be eluted and/or destroyed using an acid that increases metal solubility, and most preferably a solution that comprises MSA, an MSA salt, sulfamic acid, and/or sulfuric acid, and that further includes Ti (III) and/or Ti (IV). Depending on the particular configuration and solution, the Ti (IV) may be electrochemically converted to Ti (III), which then destroys perchlorate to thereby produce chloride. The ion exchange resins may then be rinsed (e.g., with water that may be recovered), and the spent salts can then be concentrated.

Therefore, it should be recognized that an anion exchange resin (e.g., perchlorate specific or non-specific) to which perchlorate is bound can be regenerated with methanesulfonic acid and/or a methanesulfonic acid salt, which typically includes at least one of a Ti(IV) and a Ti (III) ion. Alternative MSA salts also include those comprising at least one of an alkali metal, an alkaline earth metal, and a transition metal. Viewed from another perspective, it should be recognized that the anion exchange resin to which perchlorate is bound may be regenerated by contacting the resin with at least one of an acid and a salt of the acid, wherein the acid increases solubility of a metal ion.

Of course, it should be recognized that the eluting acid need not be limited to MSA, and that numerous alternative acids also appropriate. For example, MSA may be modified such as to increase or decrease the pKa (e.g., via halogenation or alkylation of the methyl group), or soluble polymers having alkylsulfonic acid groups may be used. Still further alternative acids include relatively strong acids forming stable anions (e.g., sulfuric acid), and/or electrochemically relatively inert acids (e.g., sulfamic acid), and all reasonable combinations thereof. Furthermore, suitable acids may include inorganic anions to compete off the bound perchlorate, and/or include complexing agents. It should be noted that the preferred concentrations of the eluting acid is relatively high, and particularly preferred concentrations of MSA and/or sulfamic acid are at least 30% of saturation, more typically at least 50% of saturation, and most preferably between about 70% and 100% of saturation. Thus, and viewed from another perspective, suitable eluents will have at least 0.2M concentration of the eluting acid, more typically at least 0.5M, even more typically at least 1.0M, and most typically at least 1.5M (and higher, including 2M, 3M, 4M, 5M) concentration of the eluting acid. Depending on the particular concentration and other factors, the pH of the eluting solution will therefore be acidic (less than pH 5, and more typically less than pH 3, and most typically less than pH 1), and most commonly be in the range of between about 2 and −1.0, more typically between 1.0 and −1.0, and most typically between −0.5 and −1.0.

With respect to the titanium, it should be noted that the Ti (IV) may be added to the MSA at any time so long as at another time Ti (III) will react with the perchlorate to form a chloride anion. Thus, reduction of perchlorate may occur on the column, in the catholyte, and/or in a separate reaction vessel. Additionally, it should be recognized that shuttle redox compounds may be present if desired. It should further be recognized that at least in some instances the presence of chloride ions in the solution may reduce the rate of reduction of perchlorate. Consequently, it should be appreciated that chloride may be removed from the solution (e.g., periodically) by methods well known in the art. For example, chloride may be removed by passing the spent reductant solution through the analyte of the electrochemically cell and converting the chloride ions to chlorine gas. Alternatively, in a less preferred aspect, chloride could be precipitated as an insoluble salt (e.g., by the addition of silver). On the other hand, as described in published U.S. Pat. Appl. No. 2003/0222031, which is incorporated by reference herein, perchlorate may also be eluted and then non-electrolytically destroyed using a iron catalyzed reaction in which ethanol is oxidized and perchlorate is reduced (preferably using a $FeCl_3/HCl$ solution).

Therefore, it should be especially appreciated that a method of perchlorate destruction includes a step of reacting the perchlorate in a solvent comprising titanium (III) and at least one of methanesulfonic acid and a methane sulfonic acid salt to thereby form chloride and at least some Ti (IV). Most typically, the Ti (III) is electrochemically generated from Ti (IV) using electrodes and configurations well known in the art. However, in alternative aspects, the electrochemical generation of Ti (III) may also be performed using a chemical reducing agent, which may or may not be generated on an electrode. Such Ti (III)-assisted perchlorate destruction is particularly advantageous as the solvent significantly accelerates the reaction as demonstrated below. Thus, viewed from yet another perspective, it should be recognized that perchlorate destruction using titanium (III) in solution can be accelerated by adding methanesulfonic acid, sulfuric, and/or sulfamic acid to the solution at a concentration effective to accelerate the perchlorate destruction.

EXAMPLES

Preparation of Ion Exchange Media ICA

Purolite® A-530E perchlorate selective ion exchange media was weighed into a 2.5 cm diameter 15 cm tall ion exchange column (e.g., Kontes™, Chromaflex™). For the following experiments, 20 g of media was used, resulting in a total bed depth of approximately 6 cm. The media was used as received with no preconditioning. Deionized water was poured onto the media to assist initial packing, and a layer of liquid was maintained over the media following initial packing. After loading, the media was split into two parts, equal by weight. The media was then designated ICA-1, ICA-2. The ICA-2 media was further subdivided into two equal parts which were designated ICA-2 and ICA-3. Media under test was reloaded into the column, while media reserved for later experiments was stored in a beaker of deionized water under ambient conditions.

Figure 2:
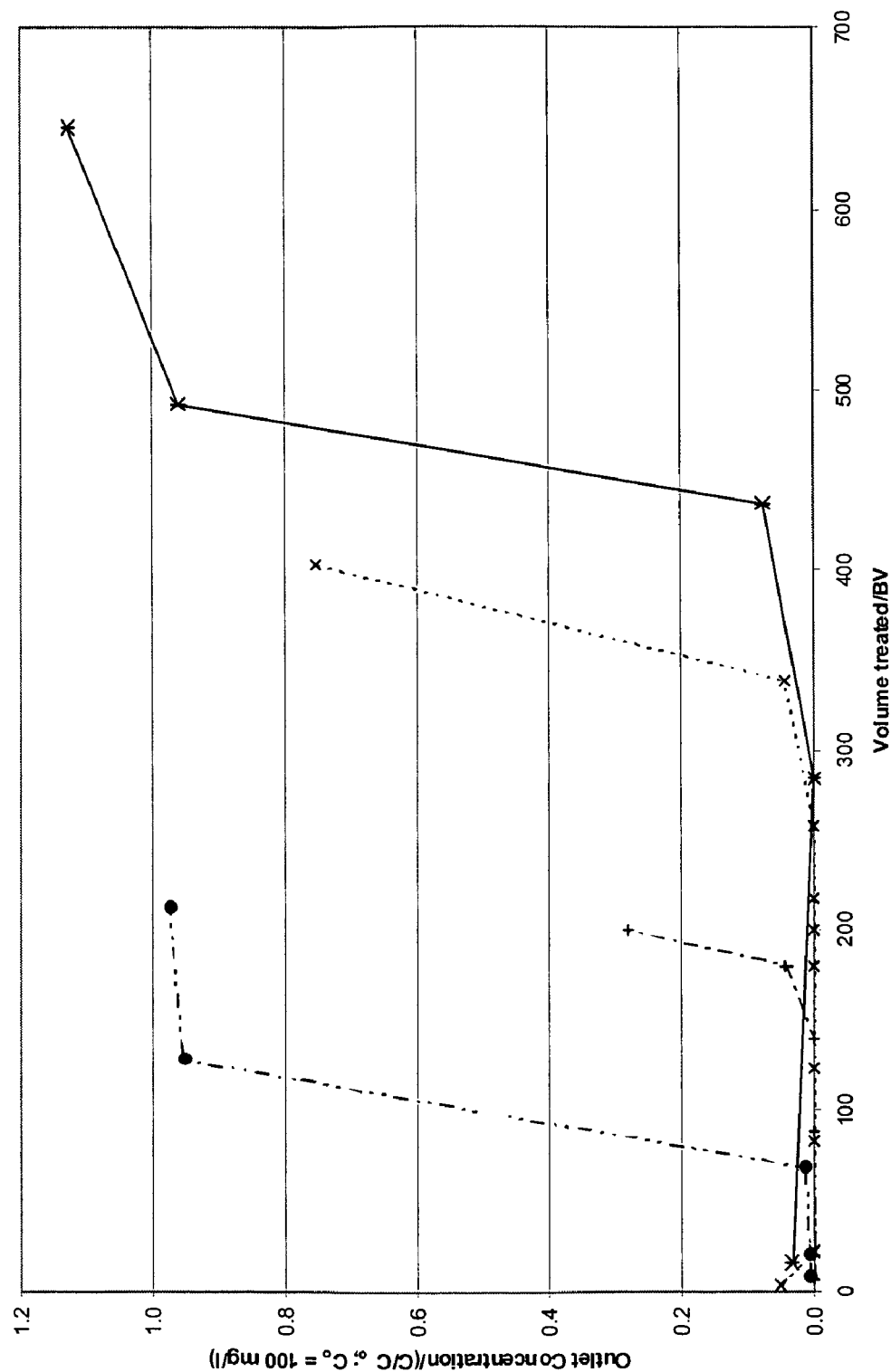
FIG. 2 is a graph depicting perchlorate concentrations in the effluent of a perchlorate selective ion exchange column in response to the following treatments (a) control—no treatment, (b) regeneration with TiOSO4, (c) regeneration with 3.7 M MSA and NaMS, (d) regeneration with 4.0 M sulfuric acid.

Media: 20 g Purolite® 530E ion exchange resin; Media ID: ICA; Initial Perchlorate Load: 100 ppm. Approx 75.0 mg/g; Test 6-IC: Media: ICA-1, 10 g. Eluent: sodium methanesulphonate (NaMS)/methanesulfonic acid (MSA). In column, one-pass, 4.6 l. Test 7-IC: Media: ICA-1, 10 g. Eluent: Na-MS/MSA. In column, one pass, 1.9 l. Test 8-IC: Media: ICA-1, 10 g. Eluent: Ti3-MS/MSA. In column, recirculating, 5 hr. Test 9-IC: Media: ICA-1, 10 g. Eluent: Ti4-OSO4/OH/MSA. In column, 1.15 l, 2 passes. The results are graphically depicted in FIG. 2. Here, the first line (solid circles) refers to 3.7M MSA, 0.2M $Na^+$, the second line (plus symbol) refers to $TiOSO_4$, the third line (x-symbol) refers to Ti (III) methane sulfonate/MSA, and the fourth line (star symbol) refers to initial loading.

Preparation of Ion Exchange Media ICB

Purolite® A-530E perchlorate selective ion exchange media was weighed into a standard 2.5 cm diameter 15 cm tall ion exchange column (e.g., Kontes™, Chromaflex™). 40 g of media were used with a bed depth of approximately 12 cm. The media was used as received, with no preconditioning. de-ionized water was poured onto the media to assist the initial packing, and a layer of liquid was maintained over the media following the initial packing. After loading, the media was split into two parts, equal by weight. The media were then designated ICB-1, ICB-2. Media under test was re-loaded into the column, while media reserved for later experiments was stored in a beaker of DI water, under ambient conditions.

Figure 3:
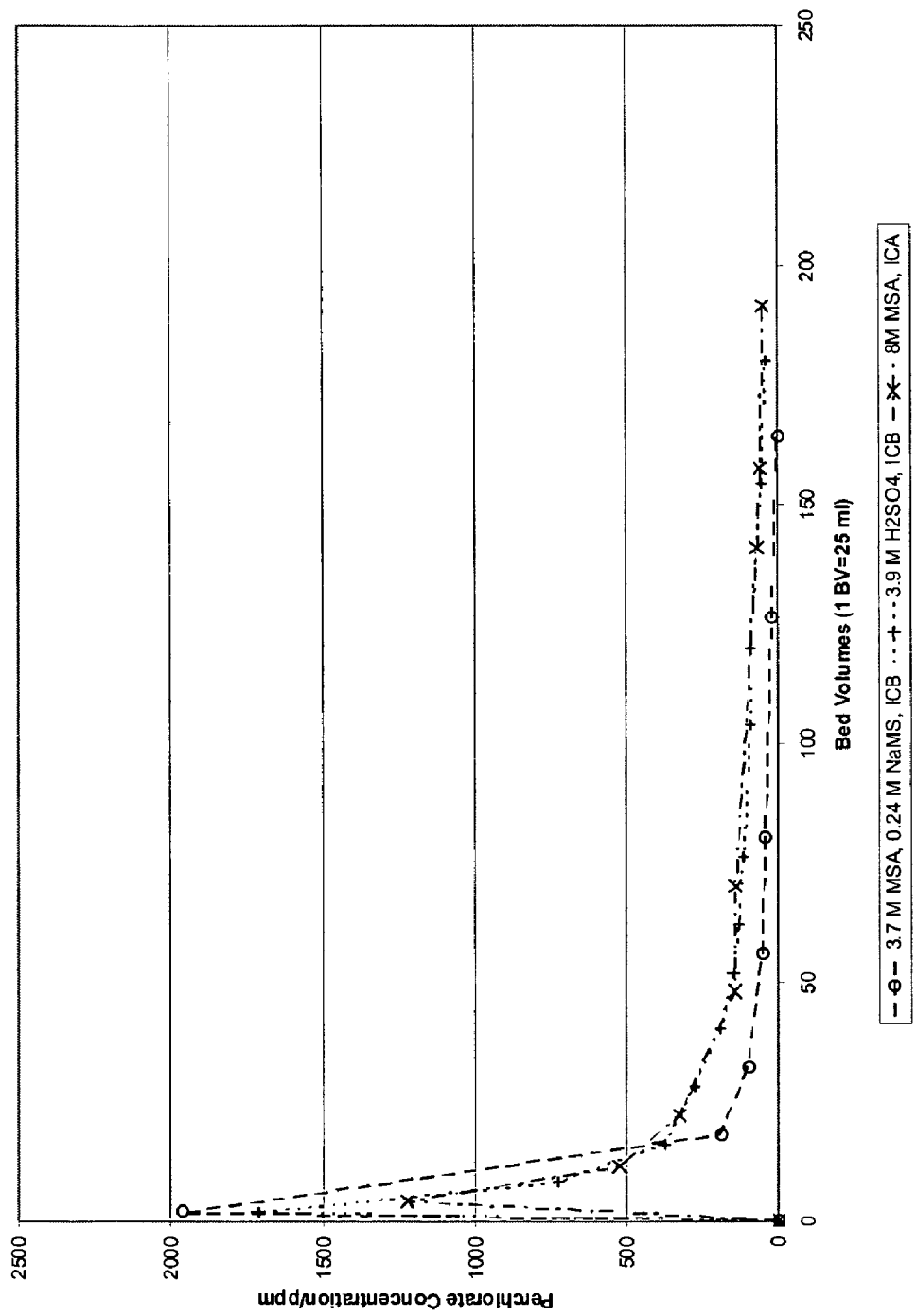
FIG. 3 is a graph depicting perchlorate concentrations in effluent during regeneration of a perchlorate selective resin.

Media: 40 g Purolite® 530E ion exchange Resin; Media ID: ICB; Initial Perchlorate load: 100 ppm. Approx 60 mg/g; Test 1-ICB: Media ICB-1, 20 g. Eluent: $TiOSO_4/H_2SO_4$. Re-circulating; overnight; Test 2-ICB: Media ICB-1, 20 g. Eluent: NaMS (0.2 M)/MSA.(3.7 M) In column, one pass, 4.2 l (Same 6-IC); Test 3-ICB: Media ICB-1, 20 g. Eluent $H2SO4$.(4 M) In column, one pass, 4.7 l. The results are graphically depicted in FIG. 3, and the figure legend denotes the respective conditions.

Exemplary Systems for Ti(IV) Reduction and Perchlorate Destruction

Figure 4:
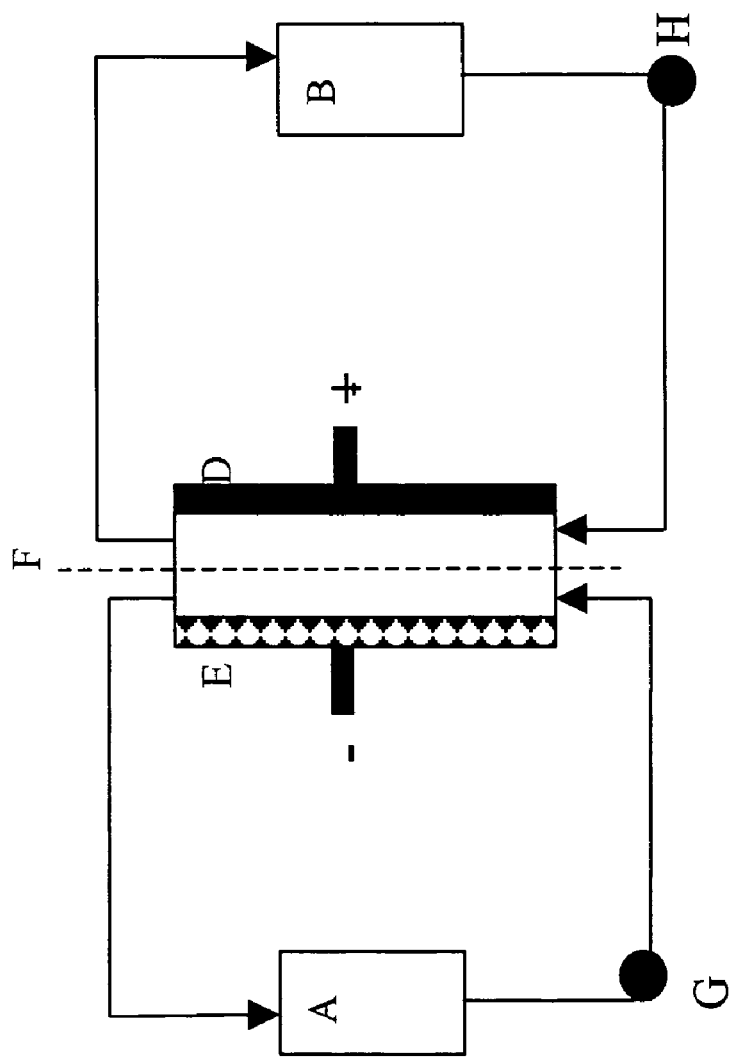
FIG. 4 is a schematic of one exemplary configuration for the generation of titanium (III) ions according to the inventive subject matter.

Methanesulfonic acid: A solution of methanesulfonic acid (70%) 100 ml, 28.17 g of titanium oxysulfate, and 100 ml of water were ion exchanged and stirred at a temperature 70° C. overnight until all the solid had dissolved and the solution became clear. This solution of Ti (IV) was introduced into the cathode compartment of an electrochemical cell as shown in FIG. 4. Here, membrane F was Nafion® 350, the cathode E a high surface area glassy carbon felt, and the anode D a Platinized titanium mesh. The anolyte in this cell was 20% methanesulfonic acid. Catholyte and anolyte were circulated past the electrodes using respective catholyte and anolyte tanks A and B, respectively, and pumps G and H.

Figure 5:
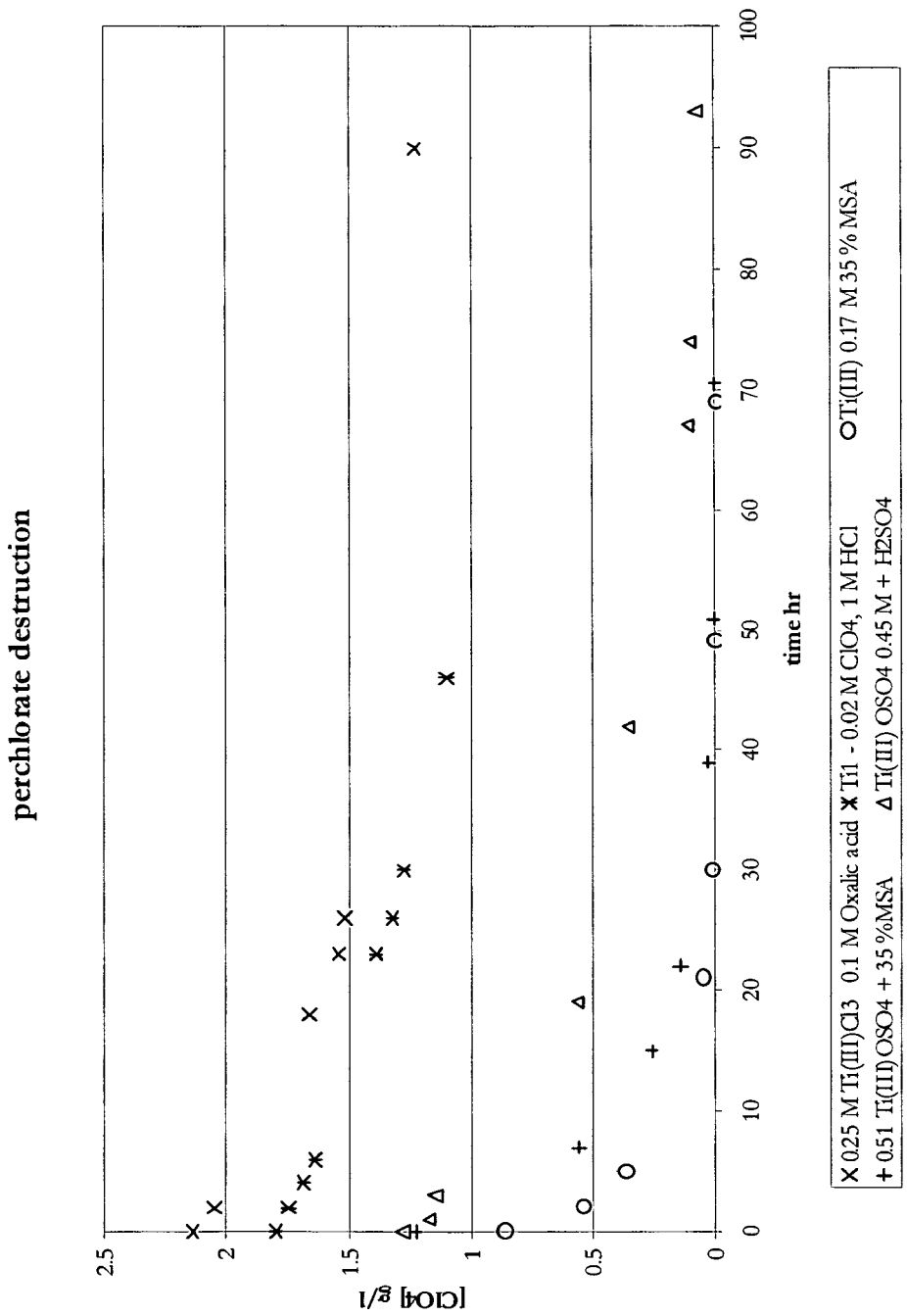
FIG. 5 is a graph depicting perchlorate concentrations during reduction with titanium (III) dissolved in various media.

A current of 2 Amps (570 A/m$^2$) was passed until, according to theory, 100% of the Ti (IV) was converted into Ti (III). The final concentration of the catholyte solution was 0.51 M of Ti (III) and 35% methanesulfonic acid. To this solution, 0.2466 g perchloric acid was added to give a solution containing 1.233 g/l perchlorate. The solution was agitated at room temperature and the progress of the reaction was followed by monitoring the perchlorate concentration as depicted in FIG. 5. At the end of 70.5 hours, residual perchlorate concentration was 585 ppb, equivalent to a 99.95% destruction. Throughout the reduction of perchlorate and of titanium (III) air was excluded by sparging with nitrogen Sulfuric Acid: A solution of sulfuric acid (98%) 40 ml, a quantity 29.3 g of titanium oxysulfate-sulfuric acid powder TiOSO4*H2SO4 and 60 mls of water were ion exchanged and stirred overnight until all the solid had dissolved. This solution of Ti (IV) was introduced into the cathode compartment of an electrochemical cell FIG. 4. The membrane was Nafion 350, the cathode a high surface area glassy carbon felt and the anode a Platinized titanium mesh. The anolyte in this cell was 20% sulfuric acid. A current of 2 Amps were passed until according to theory all the titanium (IV) was converted into Ti(III). The final concentration of the solution was 0.445 M of Ti(III) and 40% sulfuric acid. To this solution 0.123 g perchloric acid was added to give a solution containing 1.23 g/l perchlorate. The solution was agitated at room temperature, the progress of the reaction was followed by monitoring the concentration as depicted in FIG. 5. At the end of 93 hours the residual concentration was 80 ppm a perchlorate destruction of 94%. Throughout the reduction of perchlorate and titanium (III), air was excluded by sparging with nitrogen.

Ti (III) MSA: A solution of methanesulfonic acid (70%) 350 ml, a quantity 10 g of Ti metal powder and 350 ml water were ion exchanged and heated at 65° C. for several days to produce a solution of 0.17 M Ti (III) methanesulfonate in 35% MSA. To a 100 ml aliquot of this solution 0.087 g of perchloric acid was added to give a solution containing 0.87 g/l perchlorate. The solution was agitated at room temperature and the progress of the reaction was followed by monitoring the concentration as depicted in FIG. 5. At the end of 69 hours the residual concentration was 126 ppb a 99.99% perchlorate destruction. Throughout the reduction of perchlorate and titanium (III), air was excluded by sparging with nitrogen

Ti (III)-assisted Nitrate Destruction

A solution was prepared by dissolving 0.1009 g NaNO$_3$ and 12.41 g HCl into water in a volumetric flask marked at 50 mL. The solution was transferred to a 125 mL dark glass bottle and left tightly capped. Subsequently 11.47 g TiCl$_3$ was added (volume about 9.6 mL) to bring the total volume to approximately 60 mL. The rate of disappearance of nitrate with time was monitored by taking 1000 microliter samples and quenching them with 100 microliter of 30% H$_2$O$_2$ which reacts rapidly with the titanium (III). Care was taken to keep the reaction vessel tightly capped when samples were not being taken, and samples were taken in such a way as to minimize as much as possible the exposure of the contents to air. Samples were analyzed via gradient separation using an hydroxide eluent on the IC (AS11 column), with UV detection at 210 nm. Virtually all the nitrate was destroyed within 6 hours as shown in the table below.

| TIME (HR) | PPM AS NO$_3$ |
|---|---|
| 0 | 950 |
| 2 | 105 |
| 4 | 45 |
| 6 | 23 |
| 23 | 15 |

Comparative Example 1

Figure 6:
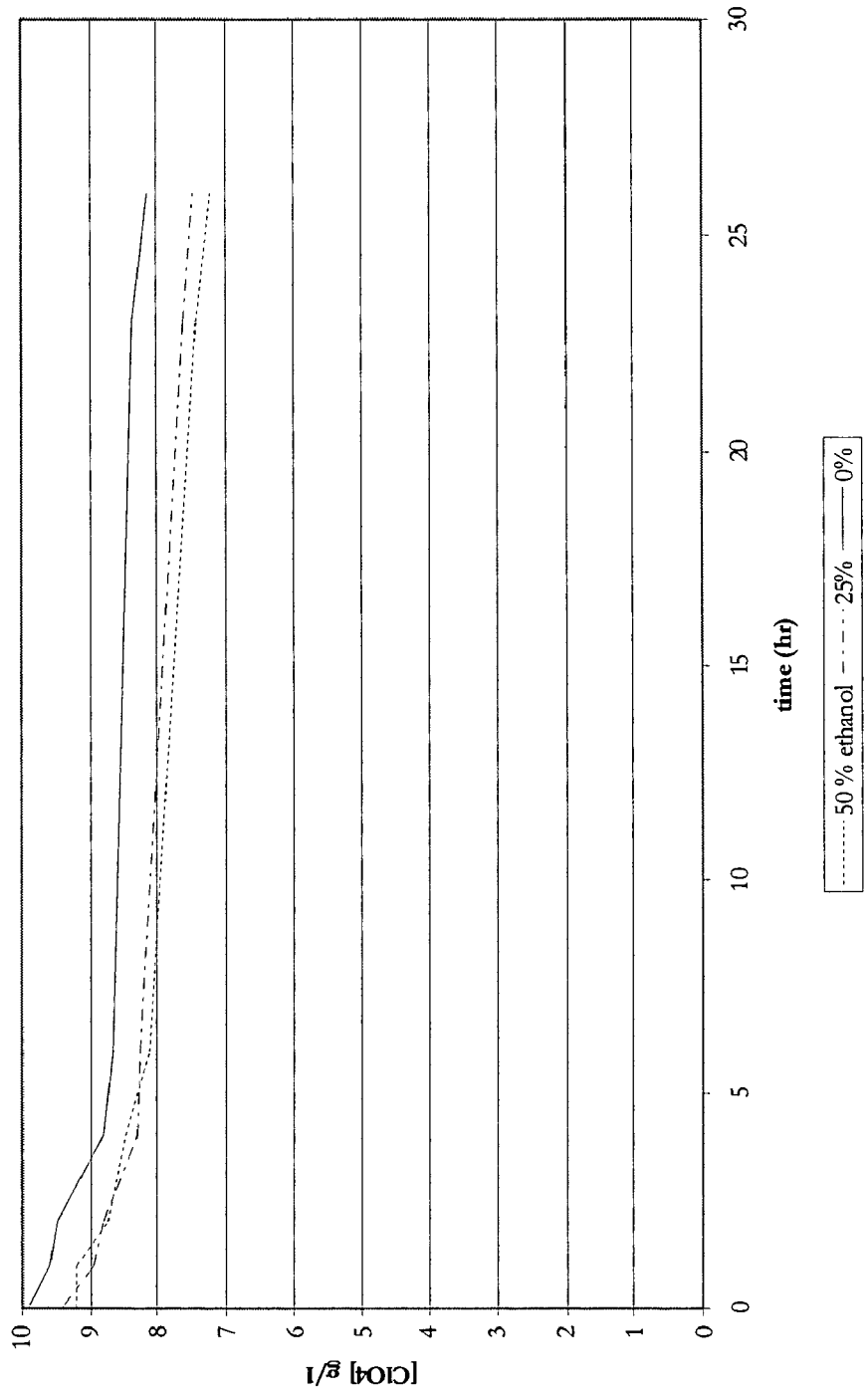
FIG. 6 is a graph depicting perchlorate concentrations during reaction with titanium (III) in the presence of 0.02 M oxalate ions.

To a solution of 0.2 M oxalic acid 0.25 M TiCl$_3$ was added. This solution was split in three equal parts to the second and third parts ethanol was added at a concentration of 25 and 50% respectively. To each of them 0.1 M ClO$_4$ was added. The progress of the reactions was followed by monitoring the perchlorate concentration. The respective destruction for these three conditions were 21, 20, and 18% after 26 hours at a rate of 0.75, 0.74, and 0.067 g/l/hr as depicted in FIG. 6.

Comparative Example 2

To a solution of 0.2 M oxalic acid 0.25 M TiCl3 was added and 1 M HC1. To each of them 0.02 M C1O4 was added. The progress of the reactions was followed by monitoring concentration. As can be seen from FIG. 6, the addition of ethanol to the solution of titanium (III) chloride and oxalic acid the reaction rate is comparatively slow when compared with the use of Titanium (III) MSA at a much lower and realistic concentration of perchlorate in solution. In comparative example 2 the perchlorate concentration is 0.02 M and again, as depicted in FIG. 5, the rate of perchlorate destruction is much slower than in the examples above where methanesulfonic acid is the dissolving species for titanium.

Figure 7:
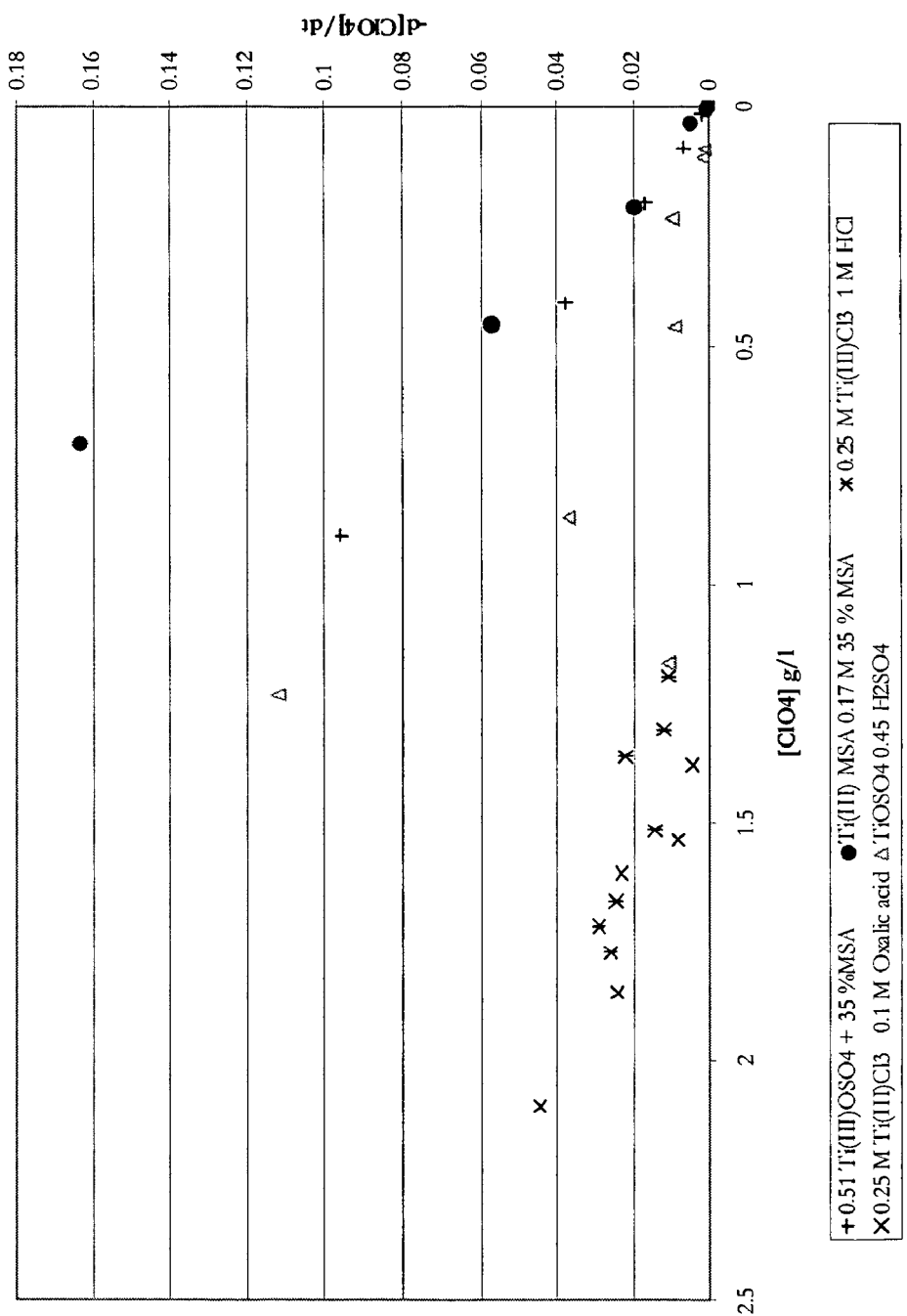
FIG. 7 is a graph depicting the rate of perchlorate destruction with titanium (III) in various media.
Figure 8:
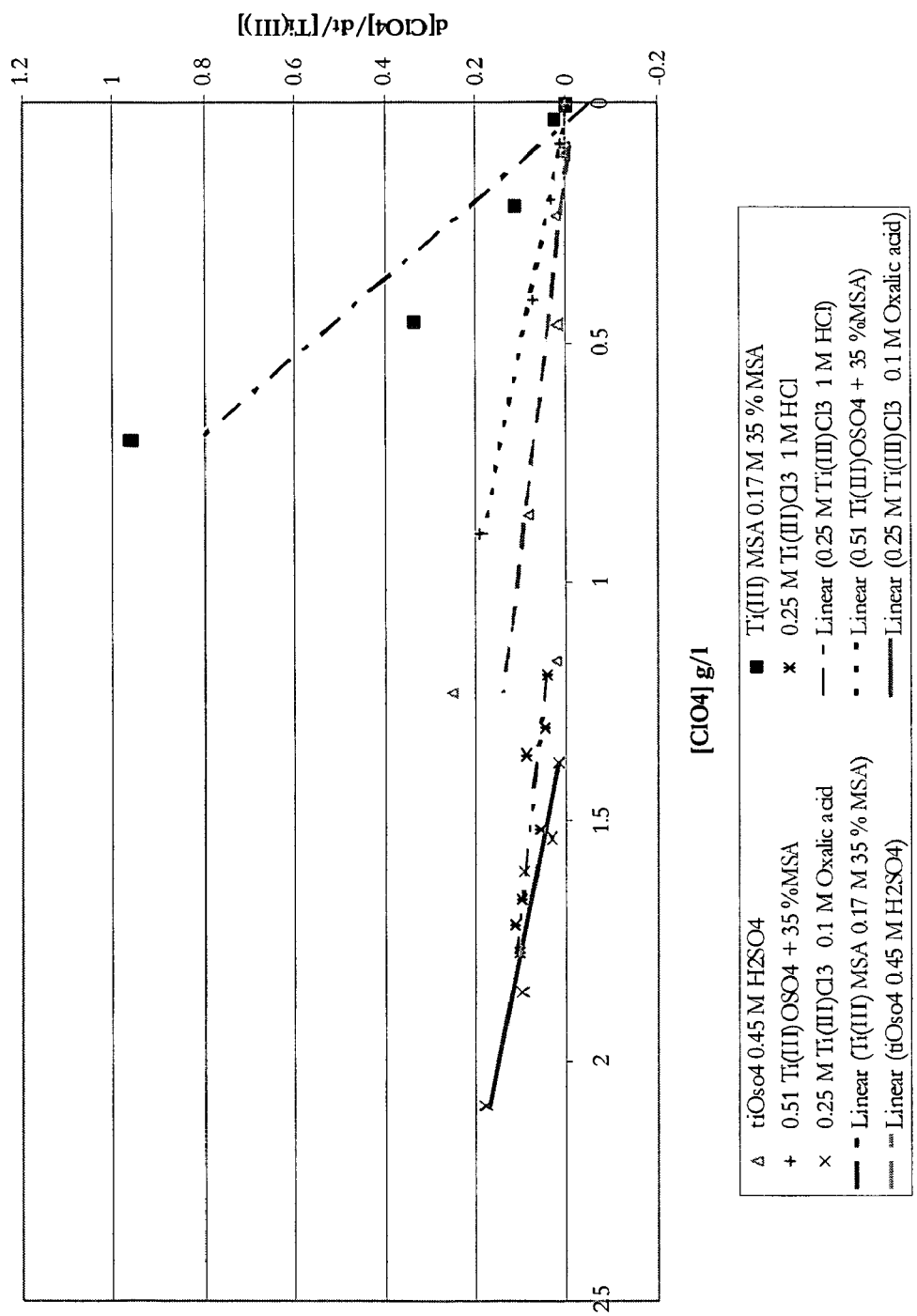
FIG. 8 is a graph depicting the pseudo 1st order rate of reaction of FIG. 7 correcting for titanium (III) concentration in the respective media.

The rate of reaction is best seen as a function of perchlorate concentration, as is shown in FIG. 7, and by normalizing the results for initial Ti (III) concentration as shown in FIG. 8. The fastest rate of reaction, once the titanium concentration is compensated for, is that of the experiment in which the counter ion to the titanium (III) is the methanesulfonate anion (as opposed to a mixture of sulfate and methanesulfonate ion). It should, however be noted that the fastest rates of perchlorate destruction are observed when perchlorate is destroyed with titanium (III) in methanesulfonic acid whether or not it is ion exchanged with sulfuric acid.

Thus, it should be recognized that the inventors discovered a method of regenerating an ion exchange resin (e.g., perchlorate selective ion exchange resin) to which perchlorate is bound, wherein the resin is contacted with a regenerant comprising methanesulfonic acid and titanium (IV). Optionally, the regenerant may also include sulfamic acid and/or sulfuric acid. In another step, the Ti (IV) in the regenerant is electrochemically reduced to Ti (III), and in still a further step, reduction of the perchlorate to chloride is performed using the Ti (III), wherein the reduction may be performed in a chemical reactor. The ion exchange resin is then rinsed with a rinse fluid to complete regeneration of the ion exchange resin. Where desirable, sodium chloride brine may be passed through the ion exchange resin to thereby convert the ion exchange resin from the methanesulfonate form to the chloride form.

Alternatively, the resin may be also be contacted with a regenerant comprising Ti (IV) methanesulfonate salts and Ti (III) methanesulfonate salts to thereby elute the perchlorate, wherein at least part of the perchlorate is reduced by the titanium (III) in the regenerant. In a further step, the Ti (IV) in the regenerant is electrochemically converted to Ti (III). Optionally, the anion exchange resin may then be rinsed with water (which may be recovered), and the Ti salts and/or brine salts may be concentrated.

Thus, specific embodiments and applications of perchlorate destruction from water and other sources have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of accelerating perchlorate destruction with titanium (III) comprising a step of adding methanesulfonic acid a solution containing perchlorate and titanium (III), wherein methanesulfonic acid is added at a concentration effective to accelerate the perchlorate destruction.

2. The method of claim 1 wherein the titanium (III) is electrochemically generated from titanium (IV).

3. A method of regenerating an anion exchange resin to which perchiorate is bound comprising a step of contacting the resin with at least one of methanesulfonic acid and a methanesulfonic acid salt, wherein the methanesulfonic acid is present at a concentration of at least 1M and wherein the methanesulfonic acid increases the solubility of a metal ion.

4. The method of claim 3 wherein the metal ion is a titanium ion.

5. A method of regenerating an anion exchange resin to which perchlorate is bound comprising a step of contacting the resin with an eluent that includes an additive selected from the group consisting of methanesulfonic acid and a methanesulfonic acid salt, wherein the additive is present at a concentration effective to accelerate perchlorate destruction as compared to the eluent without the additive.

6. The method of claim 5 wherein the anion exchange resin is a perchlorate selective ion exchange resin.

7. The method of claim 5 wherein the methanesulfonic acid salt comprises at least one of an alkali metal, an alkaline earth metal, and a transition metal.

8. The method of claim 5 wherein the methanesulfonic acid salt comprises titanium (IV).

9. The method of claim 5 wherein the methanesulfonic acid salt comprises titanium (III).

10. A method of perchlorate destruction comprising reacting the perchlorate in a solvent comprising titanium (III) and at least one of methanesulfonic acid and a methane sulfonic acid salt, wherein the at least one of the methanesulfonic acid and the methane sulfonic acid salt are present at a concentration effective to accelerate perchlorate destruction as compared to the solvent without the at least one of the methanesulfonic acid and the methane sulfonic acid salt.

11. The method of claim 10 wherein the titanium (III) is electrochemically generated from titanium (IV).

12. A method of regenerating an ion exchange resin to which perchlorate is bound comprising:
    contacting the resin with a regenerant comprising methanesulfonic acid and titanium (IV);
    wherein the methanesulfonic acid is present at a concentration effective to accelerate perchlorate destruction as compared to the regenerant without the methanesulfonic acid;
    electrochemically reducing the Ti (IV) in the regenerant to Ti (III);
    optionally transferring the solution to a chemical reactor;
    allowing reduction of the perchlorate to chloride using the Ti (III); and
    rinsing the ion exchange resin with a rinse fluid to thereby complete regeneration of the ion exchange resin.

13. The method of claim 12 wherein the ion exchange resin is a perchlorate selective ion exchange resin.

14. The method of claim 12 further comprising a step of passing sodium chloride brine through the ion exchange resin to thereby convert the ion exchange resin from a methanesulfonate form to a chloride form.

15. The method of claim 12 wherein the regenerant further comprises at least one of sulfamic acid and sulfuric acid.

16. A method of regenerating an anion exchange resin to which perchlorate is bound comprising:
    contacting the resin with a regenerant comprising Ti (IV) methanesulfonate salts and Ti (III) methanesulfonate salts to thereby elute the perchlorate, and wherein at least part of the perchiorate is reduced by the titanium (III) in the regenerant;
    wherein the Ti (III) and Ti (IV) methanesulfonate salts are present at a concentration effective to accelerate perchlorate destruction as compared to the regenerant without the methanesulfonate salts;
    electrochemically converting the Ti (IV) to Ti (III) in the regenerant;
    optionally rinsing the anion exchange resin with water; and
    optionally recovering the water and concentrating the Ti salts.

17. The method of claim 16 wherein the ion exchange resin is a perchlorate selective ion exchange resin.

18. The method of claim 16 further comprising a step of passing sodium chloride brine through the ion exchange resin to thereby convert the resin from a methanesulfonate form to a chloride form.

19. The method of claim 16 wherein the methanesulfonic acid further comprises at least one of sulfamic acid and sulfuric acid.

20. A method of removing perchlorate and nitrate from water, comprising:
    adsorbing the perchlorate and the nitrate onto an ion exchange resin;
    eluting the perchlorate and the nitrate from the ion exchange resin using brine;
    adsorbing the perchlorate and at least some of the nitrate onto a perchlorate selective resin from the brine solution;

contacting the resin with a regenerant comprising Ti (IV) methanesulfonate salts and Ti (III) methanesulfonate salts to thereby elute the perchlorate, and wherein at least part of the perchlorate is reduced by the titanium (III) in the regenerant;

wherein the Ti (III) and Ti (IV) methanesulfonate salts are present at a concentration effective to accelerate perchlorate destruction as compared to the regenerant without the methanesulfonate salts;

electrochemically converting the Ti (IV) to Ti (III) in the regenerant;

optionally rinsing the anion exchange resin with water; and optionally recovering the water and concentrating the Ti salts.

\* \* \* \* \*